United States Patent
Nevers et al.

(10) Patent No.: US 7,673,842 B2
(45) Date of Patent: Mar. 9, 2010

(54) CAPTIVE RETAINING SPRING

(75) Inventors: Craig S. Nevers, Warwick, RI (US); Kevin Willis, Westerly, RI (US); Graham M. Rippel, Walpole, MA (US); Mark O. Jones, South Dartmouth, MA (US); Karl E. Mortensen, Wakefield, RI (US); Robert J. Wedekind, Riverside, RI (US)

(73) Assignee: Koninklijke Philips Electronics, N.V, Eindhoven (NL)

( * ) Notice: Subject to any disclaimer, the term of this patent is extended or adjusted under 35 U.S.C. 154(b) by 429 days.

(21) Appl. No.: 11/461,151

(22) Filed: Jul. 31, 2006

(65) Prior Publication Data
US 2008/0023894 A1   Jan. 31, 2008

(51) Int. Cl.
*B42F 13/00* (2006.01)
(52) U.S. Cl. .................. 248/343; 248/906; 248/300; 248/200; 248/222.11; 248/342
(58) Field of Classification Search ............... 248/906, 248/300, 200, 222.11, 343, 342
See application file for complete search history.

(56) References Cited

U.S. PATENT DOCUMENTS

| 394,680 | A | 10/1888 | Dawes |
| 393,126 | A | 11/1888 | Smart |
| 684,264 | A | 10/1901 | Kemmerer |
| 866,473 | A | 9/1907 | Keefe et al. |
| 1,127,527 | A | 2/1915 | Schoen |
| 1,137,906 | A | 5/1915 | Rosenberg |
| 1,501,524 | A | 7/1924 | Cousins |
| 1,631,488 | A | 6/1927 | Jones |
| 1,662,568 | A | 3/1928 | Foell |
| 1,704,626 | A | 3/1929 | Nero |
| 2,063,923 | A * | 12/1936 | Gries ............... 220/3.6 |
| 2,305,015 | A * | 12/1942 | Langer ............ 248/318 |
| 2,518,936 | A | 8/1950 | Roberts |
| 2,554,258 | A | 5/1951 | Lundquist |
| 2,639,368 | A | 5/1953 | Pryne |
| 2,647,202 | A | 7/1953 | Elmer |
| 2,716,185 | A | 8/1955 | Burliuk et al. |
| 2,739,226 | A | 3/1956 | Rex |
| 2,753,445 | A | 7/1956 | Thomas et al. |
| 2,757,818 | A | 8/1956 | Chanberlain |
| 2,762,598 | A | 9/1956 | Runge |
| 2,802,933 | A | 8/1957 | Broadwin |
| 2,842,281 | A | 7/1958 | Chisholm |
| 2,922,030 | A | 1/1960 | Bobrick |
| 2,937,841 | A | 5/1960 | Bodian |
| 2,965,348 | A * | 12/1960 | Gerstel et al. ......... 248/343 |
| 3,018,083 | A | 1/1962 | Bobrick |
| 3,057,993 | A | 10/1962 | Gellert |
| 3,082,023 | A | 3/1963 | Rudolph et al. |
| 3,099,404 | A | 7/1963 | Kaufman et al. |
| 3,168,252 | A | 2/1965 | Cagernoch |
| 3,182,187 | A | 5/1965 | Gellert |
| 3,286,090 | A | 11/1966 | Brown |

(Continued)

*Primary Examiner*—J. Allen Shriver, II
*Assistant Examiner*—Michael McDuffie
(74) *Attorney, Agent, or Firm*—John Salazar; Middleton Reutlinger

(57) ABSTRACT

A captive retaining spring for a recessed mounting assembly has a retaining spring which is adjustable to compensate for multiple ceiling thicknesses, does not require the use of tools for installation, and may be assembled by the manufacturer and shipped ready for installation.

34 Claims, 7 Drawing Sheets

U.S. PATENT DOCUMENTS

| | | | |
|---|---|---|---|
| 3,313,931 A | 4/1967 | Klugman | |
| 3,316,399 A | 4/1967 | Totten | |
| 3,381,123 A | 4/1968 | Docimo | |
| 3,420,995 A | 1/1969 | Dunckel | |
| 3,512,743 A | 5/1970 | Lipscomb | |
| 3,518,420 A | 6/1970 | Kripp | |
| 3,544,049 A * | 12/1970 | Ribble et al. | 248/68.1 |
| 3,590,241 A | 6/1971 | Docimo et al. | |
| 3,609,346 A | 9/1971 | Lund et al. | |
| 3,620,401 A | 11/1971 | Lund | |
| 3,683,173 A | 8/1972 | Guth, Jr. | |
| 3,697,742 A | 10/1972 | Bobrick | |
| 3,700,885 A | 10/1972 | Bobrick | |
| 3,749,873 A | 7/1973 | Harper et al. | |
| 3,778,609 A | 12/1973 | Ligerman | |
| 3,872,296 A | 3/1975 | Cohen et al. | |
| 4,039,822 A | 8/1977 | Chan et al. | |
| 4,048,491 A * | 9/1977 | Wessman | 362/364 |
| 4,086,480 A | 4/1978 | Lahm | |
| 4,142,227 A | 2/1979 | Aikens | |
| 4,232,361 A | 11/1980 | Kelsall | |
| 4,250,540 A * | 2/1981 | Kristofek | 362/368 |
| 4,274,615 A | 6/1981 | Chan et al. | |
| 4,293,895 A | 10/1981 | Kristofek | |
| 4,318,161 A | 3/1982 | Shanks | |
| 4,318,162 A | 3/1982 | Sip | |
| 4,336,575 A | 6/1982 | Gilman | |
| 4,382,274 A | 5/1983 | De Backer et al. | |
| 4,408,262 A | 10/1983 | Kusmer | |
| 4,414,617 A | 11/1983 | Galindo | |
| 4,431,151 A | 2/1984 | Schonasky | |
| 4,459,648 A | 7/1984 | Ullman | |
| 4,471,416 A | 9/1984 | Druffel | |
| 4,473,873 A | 9/1984 | Quiogue | |
| 4,475,147 A | 10/1984 | Kristofek | |
| 4,510,559 A | 4/1985 | Kristofek | |
| 4,605,816 A | 8/1986 | Jorgensen et al. | |
| 4,623,956 A | 11/1986 | Conti | |
| 4,646,212 A | 2/1987 | Florence | |
| 4,704,664 A | 11/1987 | McNair | |
| 4,729,080 A | 3/1988 | Fremont et al. | |
| 4,733,339 A * | 3/1988 | Kelsall | 362/366 |
| 4,739,460 A * | 4/1988 | Kelsall | 362/365 |
| 4,745,533 A | 5/1988 | Smerz | |
| 4,751,624 A | 6/1988 | Russo et al. | |
| 4,751,627 A | 6/1988 | Usher | |
| 4,754,377 A | 6/1988 | Wenman | |
| 4,829,410 A | 5/1989 | Patel | |
| 4,887,196 A | 12/1989 | Brown et al. | |
| 5,045,985 A | 9/1991 | Russo et al. | |
| 5,068,772 A | 11/1991 | Shapiro et al. | |
| 5,122,944 A | 6/1992 | Webb | |
| 5,124,901 A | 6/1992 | Sojka et al. | |
| 5,130,914 A | 7/1992 | Bengochea | |
| 5,222,800 A | 6/1993 | Chan et al. | |
| 5,236,157 A * | 8/1993 | Reggiani | 248/27.1 |
| 5,291,381 A | 3/1994 | Price | |
| 5,314,148 A | 5/1994 | Jones | |
| 5,317,493 A | 5/1994 | Muller et al. | |
| 5,373,431 A | 12/1994 | Hayman et al. | |
| 5,377,088 A * | 12/1994 | Lecluze | 362/366 |
| 5,452,193 A | 9/1995 | Hinnefeld et al. | |
| 5,457,617 A | 10/1995 | Chan et al. | |
| 5,538,214 A | 7/1996 | Sinila | |
| 5,556,188 A | 9/1996 | Poppenheimer | |
| 5,562,343 A | 10/1996 | Chan et al. | |
| 5,564,815 A | 10/1996 | Litman et al. | |
| 5,567,041 A | 10/1996 | Slocum | |
| 5,609,414 A * | 3/1997 | Caluori | 362/366 |
| 5,630,663 A | 5/1997 | Ling et al. | |
| 5,669,324 A | 9/1997 | Muir, III | |
| 5,672,004 A | 9/1997 | Schmidt, Jr. | |
| 5,738,436 A | 4/1998 | Cummings et al. | |
| 5,758,959 A | 6/1998 | Sieczkowski | |
| 5,800,050 A | 9/1998 | Leadford | |
| 5,823,664 A | 10/1998 | Demshki, Jr. et al. | |
| 5,826,970 A | 10/1998 | Keller et al. | |
| 5,857,766 A | 1/1999 | Sieczkowski | |
| 5,941,625 A * | 8/1999 | Morand | 362/148 |
| 5,944,412 A * | 8/1999 | Janos et al. | 362/365 |
| 5,951,151 A | 9/1999 | Doubeck et al. | |
| 6,016,596 A * | 1/2000 | Rodgers | 29/426.6 |
| 6,079,852 A | 6/2000 | Kamaya et al. | |
| 6,113,245 A | 9/2000 | Reinert, Sr. | |
| 6,132,245 A | 10/2000 | Wertz et al. | |
| 6,142,439 A | 11/2000 | Aramaki | |
| 6,145,798 A | 11/2000 | Janisse et al. | |
| 6,220,728 B1 | 4/2001 | Andrus et al. | |
| 6,234,644 B1 | 5/2001 | Kotovsky et al. | |
| 6,270,238 B1 | 8/2001 | Mendelsohn et al. | |
| 6,343,873 B1 | 2/2002 | Eberhard et al. | |
| 6,364,510 B1 | 4/2002 | Bernhart et al. | |
| 6,375,338 B1 | 4/2002 | Cummings et al. | |
| 6,431,723 B1 | 8/2002 | Schubert et al. | |
| 6,505,960 B2 | 1/2003 | Schubert et al. | |
| 6,554,458 B1 * | 4/2003 | Benghozi | 362/365 |
| 6,827,471 B1 * | 12/2004 | Benghozi | 362/365 |
| 7,118,254 B2 | 10/2006 | Czech | |
| 7,234,674 B2 | 6/2007 | Rippel et al. | |
| 7,331,555 B2 * | 2/2008 | St-Pierre | 248/343 |
| 2002/0131271 A1 * | 9/2002 | Schubert et al. | 362/365 |
| 2003/0161155 A1 | 8/2003 | Caluori | |
| 2003/0223240 A1 | 12/2003 | Houle | |
| 2005/0258326 A1 * | 11/2005 | St-Pierre | 248/316.7 |

* cited by examiner

CAPTIVE RETAINING SPRING

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates generally to recessed enclosures, and more particularly to a retaining spring for a recessed enclosure which is adjustable for varying ceiling thicknesses, may be installed without the use of tools, and may be assembled with the recessed enclosure by the manufacturer prior to shipment of the recessed enclosure assembly.

2. Description of the Related Art

Recessed enclosures, such as, downlight fixtures have become increasingly popular for residential and commercial use. One reason for the increased popularity is that the recessed downlight fixtures meet a wide range of interior lighting requirements while also being aesthetically pleasing. Recessed lighting fixtures or downlights provide lighting for an area and are aesthetically pleasing due in part to the unobtrusive nature of the fixtures themselves which are typically recessed within the ceiling. Further, recessed downlight fixtures may be installed in new constructions as well as existing ceilings and therefore are valued by installers. Typically, ceiling-mounted recessed downlight fixtures comprise a frame-in kit with means for securing the frame to structural supports of the ceiling. For installation, the frame of the light fixture may include holes or brackets through which fasteners are positioned to attach the fixture to the supports.

A support system is often employed to suspend a recessed lighting fixture assembly between adjacent supports. Conventional downlights may be installed between ceiling joists or from suspended ceiling grids. Although ceiling thickness may change in various installations, the recessed lighting assembly must be easily adaptable for use from one installation to another. Heretofore, recessed lighting retaining devices have utilized various devices to adapt for various ceiling thicknesses. However, many of these devices may not be assembled with the recessed lighting can prior to installation because they entered from the lighting can and rendering shipping difficult. Moreover, many of these structures require an installer to use various tools to assemble the retaining structures to the recessed lighting can for support above ceilings. Otherwise stated, the retaining structures cannot be assembled by the manufacturer prior to shipment of the product and installation. This is cumbersome, time consuming to install, and not desirable for installers.

Given the foregoing, it will be appreciated that a retaining device is needed which allows assembly by the manufacturer, functions with various ceiling thicknesses, and allows installation without the use of tools.

SUMMARY OF THE INVENTION

The present invention improves edge-to-edge printing by providing improved support structures.

According to a first exemplary embodiment, a recessed mounting assembly comprises a recessed enclosure having a sidewall, a first adjustment portion and a second adjustment portion disposed in the sidewall, a retaining spring having a first end and a second end, the first end disposed in the first adjustment portion, the second end disposed in the second adjustment portion, the retaining spring being adjustable without the use of tools. The spring is adjustable for varying ceiling thicknesses. The spring causes a force substantially parallel to the longitudinal axis of said recessed lighting can. The spring applies force to a ceiling a spaced distance from a ceiling aperture edge. The spring has a substantially curvilinear shape. The spring has a first cross-bar at a first end and a second cross-bar at a second end. The recessed mounting assembly further comprises at least one finger at ends of the first cross-bar. The first adjustment portion disposed above the second adjustment portion.

According to a second exemplary embodiment, a tool-less ceiling mounting assembly for a recessed enclosure comprises an enclosure having a sidewall, a captive retaining spring extending from the enclosure, the captive spring being adjustable in the recessed lighting can for use with various ceiling thicknesses, the captive spring applying a substantially vertical retaining force. The tool-less ceiling mounting assembly further comprises a fixture flange. The captive spring engages the fixture flange. The sidewall is substantially cylindrical in shape. The sidewall has a spring adjustment area wherein a spring may be adjustably retained. The spring adjustment area receives a first end of the captive spring and a second end of the spring. The first end and the second end of the captive spring adjustable in a vertical direction.

According to a third exemplary embodiment, a tool-less recessed mounting assembly for a recessed light comprises a recessed lighting can having a substantially cylindrical sidewall, a spring adjustment area in the cylindrical sidewall, a spring extending from the cylindrical sidewall and disposed within the spring adjustment area, connection between the spring and the cylindrical sidewall being adjustable by hand and without the use of tools. The spring has a first end connected to the sidewall at the spring adjustment area and a second end slidable through the spring adjustment area. The spring providing a substantially vertically directed force. The spring provides the force a spaced distance from an edge of a ceiling aperture. The tool-less recessed mounting assembly further comprises a fixture flange depending from the recessed lighting can.

According to a fourth exemplary embodiment, a recessed enclosure mounting assembly comprises a retaining spring having a first end and a second end, an enclosure having a sidewall and at least one adjustment area for receiving the spring, a ceiling structure having an aperture, the enclosure extending through the aperture, the retaining spring captured between the adjustment area and an upper surface of the ceiling structure. The retaining spring provides a downward force on the ceiling a spaced distance from an edge of the ceiling aperture. The adjustment area has a first adjustment portion and a second adjustment portion. The first adjustment portion comprising a plurality of adjustment apertures. The retaining spring is vertically adjustable through the adjustment area. The retaining spring is adjustable without the use of tools. The retaining spring has an elastic body, an upper neck extending from the elastic body and a lower neck below the elastic body. The upper neck and the lower neck slideably extends through the sidewall of the enclosure.

According to a fifth exemplary embodiment, a combination captive retaining spring and enclosure for a recessed mounting assembly comprises an enclosure having a sidewall, the sidewall comprising a plurality of vertically spaced adjustment apertures for vertical adjustment of the enclosure, a retaining spring which may be adjustably positioned within the enclosure without the use of a tool, a clip depending from the enclosure, a ceiling structure having an upper surface and a lower surface, the upper surface engaged by the retaining spring and the lower surface engaged by the clip. The retaining spring provides a downward force on the ceiling structure spaced from an aperture edge of the ceiling structure. The retaining spring is toollessly adjustable.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
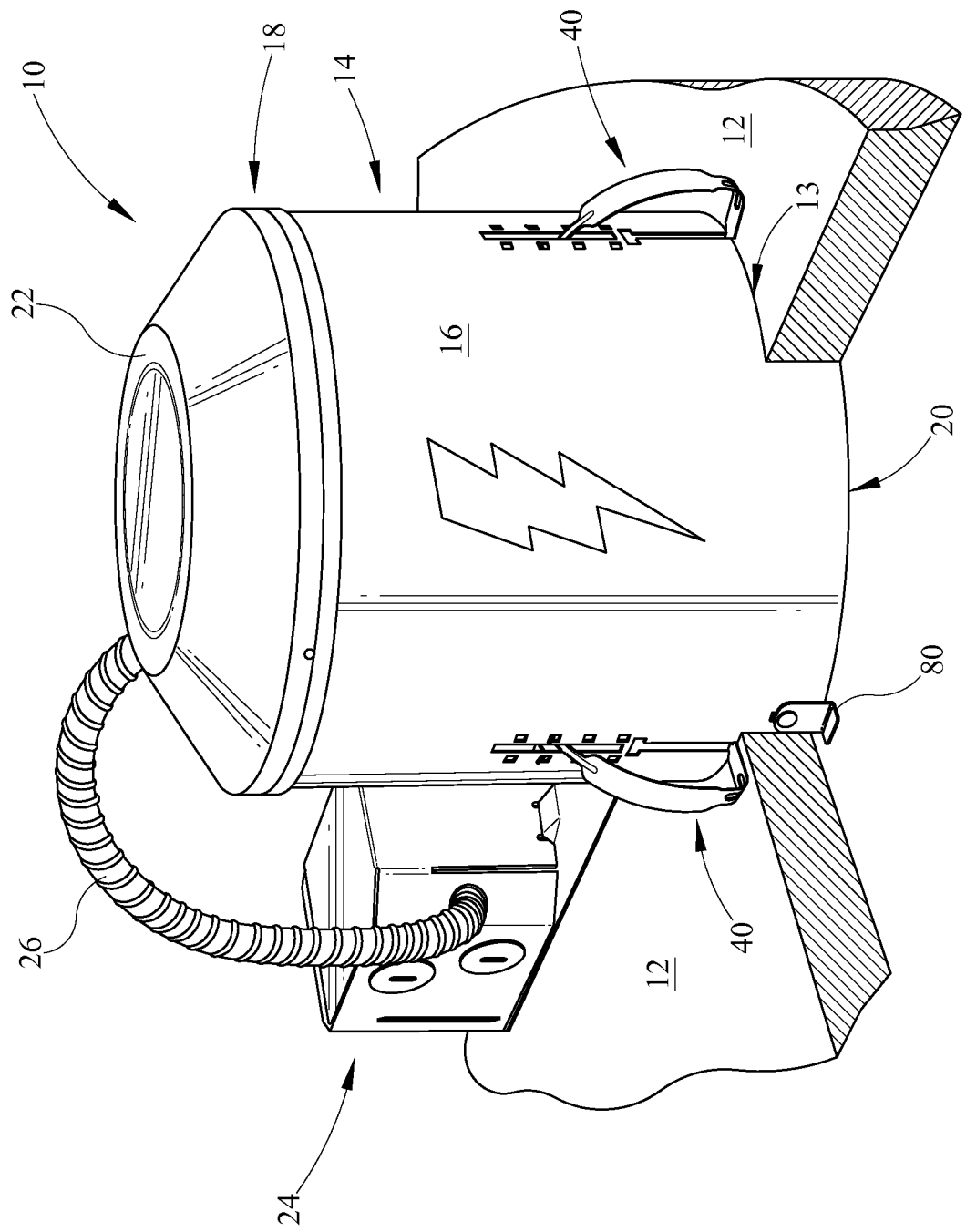
FIG. 1 is a perspective view of a recessed lighting assembly.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout the several views, there are shown in FIGS. 1-7 various aspects of a captive retaining spring for a recessed enclosure. The retaining spring may be adjustable to compensate for multiple ceiling thicknesses, does not require the use of tools for installation, and may be assembled by the manufacturer. Further the present invention is described with reference to a recessed lighting can, but may alternatively be utilized with a ventilation system, a smoke detector, a security system, other recessed electrical device requiring a housing or the like.

Referring initially to FIG. 1, a recessed lighting assembly 10 is depicted in perspective view and mounted generally above a ceiling structure 12. For reason of clarity, the recessed lighting hanger bars are not shown. One skilled in the art will realize that such hanger bars are generally connected between ceiling joists or suspended ceiling grid members. The hanger bars are generally adjustable lengthwise to allow installation between varying joist distances or from ceiling grids of various size. The ceiling structure 12 is partially cut away in sectional view to reveal the recessed lighting assembly therein. The ceiling structure 12 may be, for example, a fixed ceiling of drywall or plaster, or a removable ceiling panel. The recessed lighting assembly comprises a recessed lighting can or enclosure 14. The can 14 may be formed of various materials such as steel, galvanized steel, aluminum, fiberglass, laminates, composites or other lightweight rigid material for retaining electrical components and elements between structural members, such as hanger bars. The exemplary recessed lighting can 14 is substantially cylindrical in shape as defined by sidewall 16 with upper and lower ends 18, 20. At the upper end 18 of the recessed lighting can 14 is a closed end top 22 which substantially closes the cylindrical lighting can 14. The closed end 22 may be attached to the upper end 18 of the recessed lighting can 14 by various means including fasteners such as rivets or screws or otherwise slidably attached to the upper edge of the can 14 in order to inhibit access of contaminants into the lighting can 14 from above. The closed end top 22 may be frusto-conical in shape or substantially disk like and flat depending on the clearance above the recessed lighting can 14. The closed end top 22 may also be formed of various materials but is preferably formed of the same material as the can 14.

Interior of the top 22, various electrical components are located for providing illumination are provided. Such components include a socket cup (not shown) and socket (not shown) which receives a lamp. Various types of lamps may be utilized such as incandescent, fluorescent, compact fluorescent, halogen, quartz and others know to one skilled in the art. If desirable a reflector (not shown) may be utilized within the can 14. In addition, a trim piece (not shown) may be installed at the lower end 20 of the recessed can 14. Such trim may aid in light distribution.

Spaced from the recessed lighting can 14 is a junction box 24 wherein connections may be made between a power source and the recessed lighting assembly 10. The junction box 24 may be formed of various materials but is also preferably formed of a lightweight rigid material. The junction box 24 may further comprise a removable or hingedly attached door providing access to the junction box interior. The junction box 24 may be used to wire various devices including but not limited to the recessed lights. For example fans, security systems, electric roof windows, wall outlets or other such devices requiring strain relief.

Extending between the junction box 24 and the recessed lighting can 14 is a conduit 26. The conduit 26 may be metallic with wiring of various gauge extending therethrough. Within the conduit 26 are a plurality of wires extending between the junction box 24 and the lighting elements within the recessed lighting can 14. The wiring provides control and power to the lighting socket. Alternatively, Romex cable, non metallic building wire, or other such electric connecting components may be used. A clamp may be positioned between in or around the junction box 24 to inhibit wire pulling through the conduit 26.

Along the sidewall 16 of the recessed lighting can 14 is at least one captive retaining spring 40. According to one exemplary embodiment, the can 14 utilizes three retaining springs 40 spaced substantially equidistantly about the periphery of the can 14. The springs 40 are captured between the ceiling and the engagement with the can 14. The captive retaining springs 40 provide a substantially vertical downward force on the upper surface of ceiling 12 in order to retain the recessed lighting can 14 in position extending through the ceiling aperture 13 of ceiling 12. The captive retaining springs 40 are adjustable in order to allow easy installation regardless of the ceiling thickness. Specifically, the captive retaining springs 40 are adjustable in a vertical direction. The captive retaining springs 40 may be shipped from the manufacturer in an assembled position and may be installed to retain the recessed lighting can 14 in its desired position without the use of tools as required by many prior art devices.

Beneath the captive retaining springs 40 along the sidewall 16 of the recessed lighting can 14 is at least one clip 80. Since the captive retaining springs 40 provide a downward force on the upper surface of the ceiling 12, the at least one clip 80 captures the ceiling 12 to fully retain the recessed lighting can 14 in its desired position relative to the lower surface of ceiling 12. The clip 80 may be formed of various lightweight rigid materials and may be fastened or otherwise affixed to the sidewall 16. Further, the clips 80 may be spaced about the lower perimeter 20 of the can 14.

Figure 2:
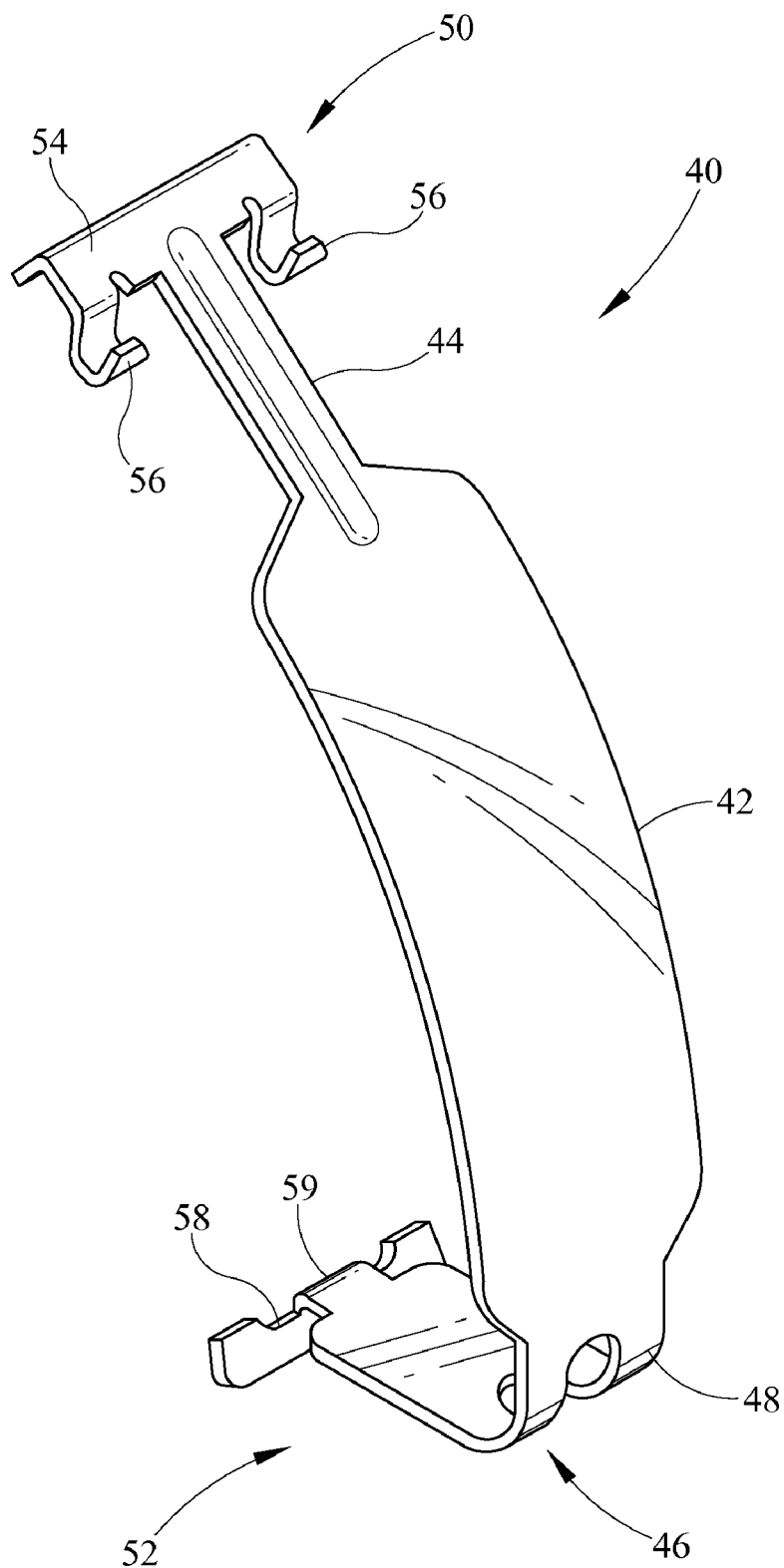
FIG. 2 is a perspective view of a captive retaining spring for the recessed lighting assembly of FIG. 1.

Referring now to FIG. 2, a perspective view of the retaining spring 40 is depicted in a generally vertical orientation, as located in the lighting can 14. The captive retaining spring 40 comprises an elastic body 42 having an upper neck 44 extending upwardly from the elastic body 42 and at least one leg 46 depending from a lower portion of the elastic body 42. The exemplary spring 40 is formed of a thin resilient metal which may bend to provide force on the ceiling 12. In its bent position, the spring 40 is captured between the ceiling 12 and lighting can 14. The upper neck 44 has a width which is less than the width of the elastic body 42. The at least one leg 46 is depicted as two legs depending from the body 42. The at least one leg 46 has a bend or knee 48 therein and the exemplary embodiment utilizes two legs depending from the elastic body 42. The captive retaining spring 40 is substantially curvilinear in shape having a first end 50 and a second end 52. The exemplary sidewall 16 of the recessed lighting can 14 is substantially vertical in shape and therefore the first end 50 and second end 52 are disposed at substantially radial positions relative to the can 14. Such configuration is provided by the curvilinear shape of the retaining spring 40 and the knee 48 in the at least one leg 46. At an upper portion of the upper neck 44 is an upper retaining crossbar 54. The crossbar 54 is generally L-shaped but various configurations may be utilized. The crossbar 54 has opposed fingers 56 distal from the upper neck 44. The fingers 56 are generally C-shaped and depend from an edge of the crossbar 54. The fingers 56 have a substantially rectangular cross-section with a tapered end opposite the crossbar 54. The fingers 56 engage the upper adjustment area of the recessed lighting can 14 providing an upper position limiting feature for the captive retaining spring 40. The second end 52 of the retaining spring 40 comprises a lower retaining crossbar 58. The lower retaining crossbar 58 is positioned within a lower adjustment area of the recessed lighting can 14.

Figure 3:
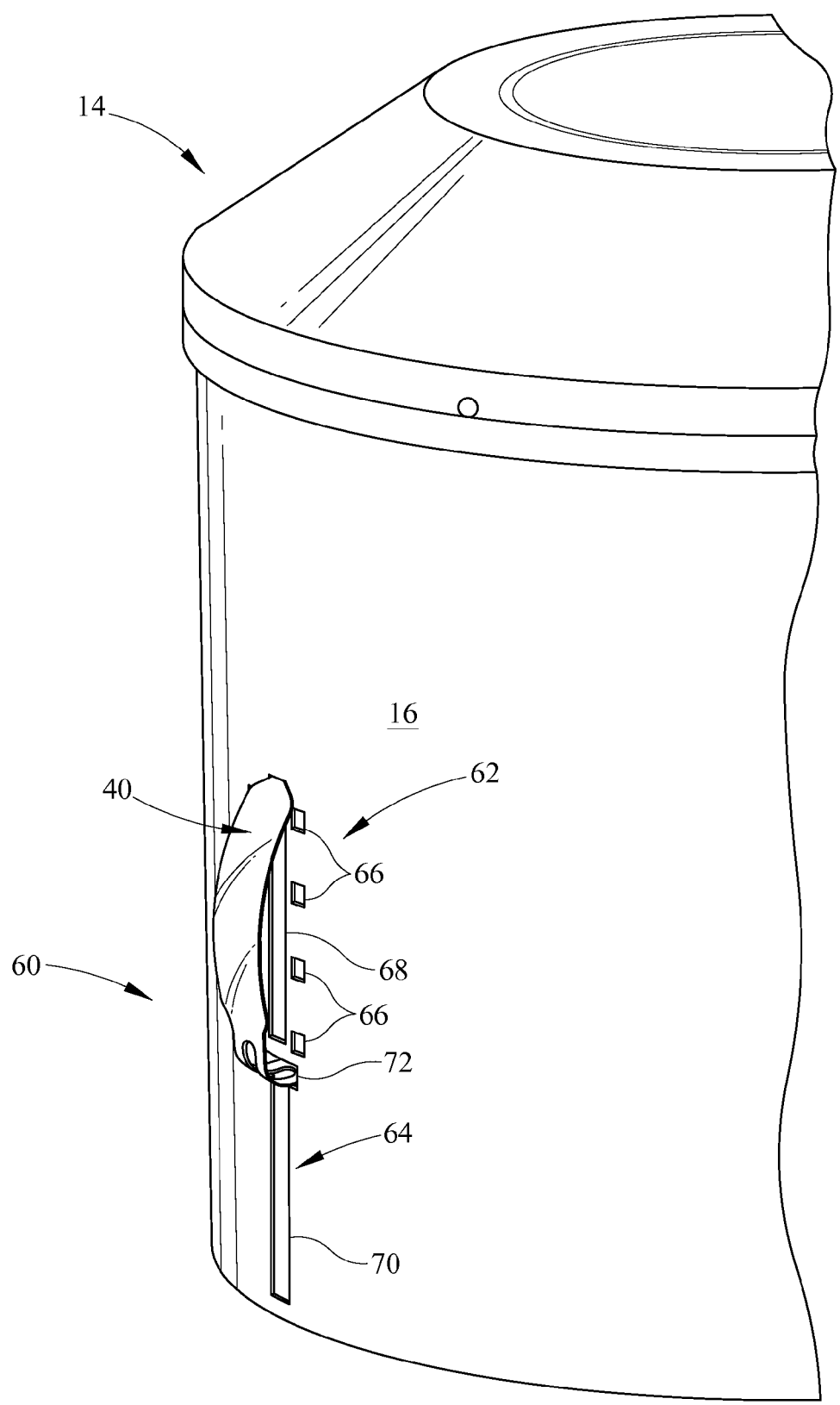
FIG. 3 is a perspective view of the captive retaining spring of FIG. 2 fully inserted in the recessed lighting assembly.

Referring now to FIG. 3, a perspective view of the recessed lighting can 14 is depicted showing the captive retaining spring 40 extending within the recessed lighting can sidewall 16. The recessed lighting can 14 comprises an adjustment area 60 which allows for vertical positioning adjustment of the spring 40. Consequently, such adjustment allows use with ceilings of varying thickness. The adjustment area 60 comprises a first upper adjustment portion 62 and a second lower adjustment portion 64. The first adjustment portion 62 comprises a plurality of adjustment apertures 66 spaced apart on opposite sides of a first upper slot detail 68. The apertures 66 are arranged in horizontal pairs spaced apart a distance corresponding to the distance between fingers 56 (FIG. 2). The first slot detail 68 is substantially vertically oriented and allows the arm 44 of the retaining spring 40 to slide vertically therein. The first slot detail 68 has a width which is less than the width of the elastic body 42 and less than the width of the upper crossbar 54, and greater than the width of neck 44 so that the spring 40 may slide vertically therein. Once installed, the first end 50 of the retaining spring 40 is retained within the slot 68. The apertures 66 are substantially square in shape but may comprise alternative shapes allowing the fingers 56 to extend therethrough. Thus, the first end 50 of the retaining spring 40 is disposed within the slot 68 and the fingers 56 may be positioned in the adjustment apertures 66 adjacent the slot 68. The fingers 56 are curled so that when bent an upward elastic force of the retaining spring 40 causes the fingers 56 to engage the upper edge of the adjustment apertures 66. This design captures the spring 40 inhibiting vertical movement and further creates a downforce on ceiling 12.

The second end 52 of the retaining spring 40 is disposed through the second adjustment portion 64, which is substantially T-shaped but may comprise alternative structural configurations. The second adjustment portion 64 comprises a substantially vertical second slot detail 70 and a substantially horizontal slot detail 72 defining the substantially T-shaped second adjustment portion 64. It should be understood that although two adjustment portions are depicted, the upper and lower adjustment portions 62,64 may be connected vertically forming a single vertical slot wherein the first and second adjustment portions 62,64 are defined by horizontal slot detail 72. The second end 52 of the retaining spring 40 extends through the horizontal slot detail 72 when the retaining spring 40 is disposed in an uppermost position of the first adjustment portion 62. As depicted in FIG. 3, the at least one leg 46 (FIG. 2) is extending inwardly into the recessed lighting can 14, in a fully inserted position. The retaining spring 40 may be shipped from the manufacturer in this configuration and is advantageous over the prior art since various prior art devices require tools and, for instance, fasteners for installation and assembly. To the contrary, the instant exemplary embodiment allows for shipping of the captive retaining spring 40 in an assembled position inserted into the recessed lighting can 14 without requiring the use of tools to disassemble and install the spring 40 in the can 14 when the recessed lighting can 14 is positioned through a ceiling aperture 13 as shown in FIG. 1. With the captive retaining spring 40 fully inserted, the recessed lighting can 14 has less of an extended profile which is preferred for shipping the product to customers.

Figure 4:
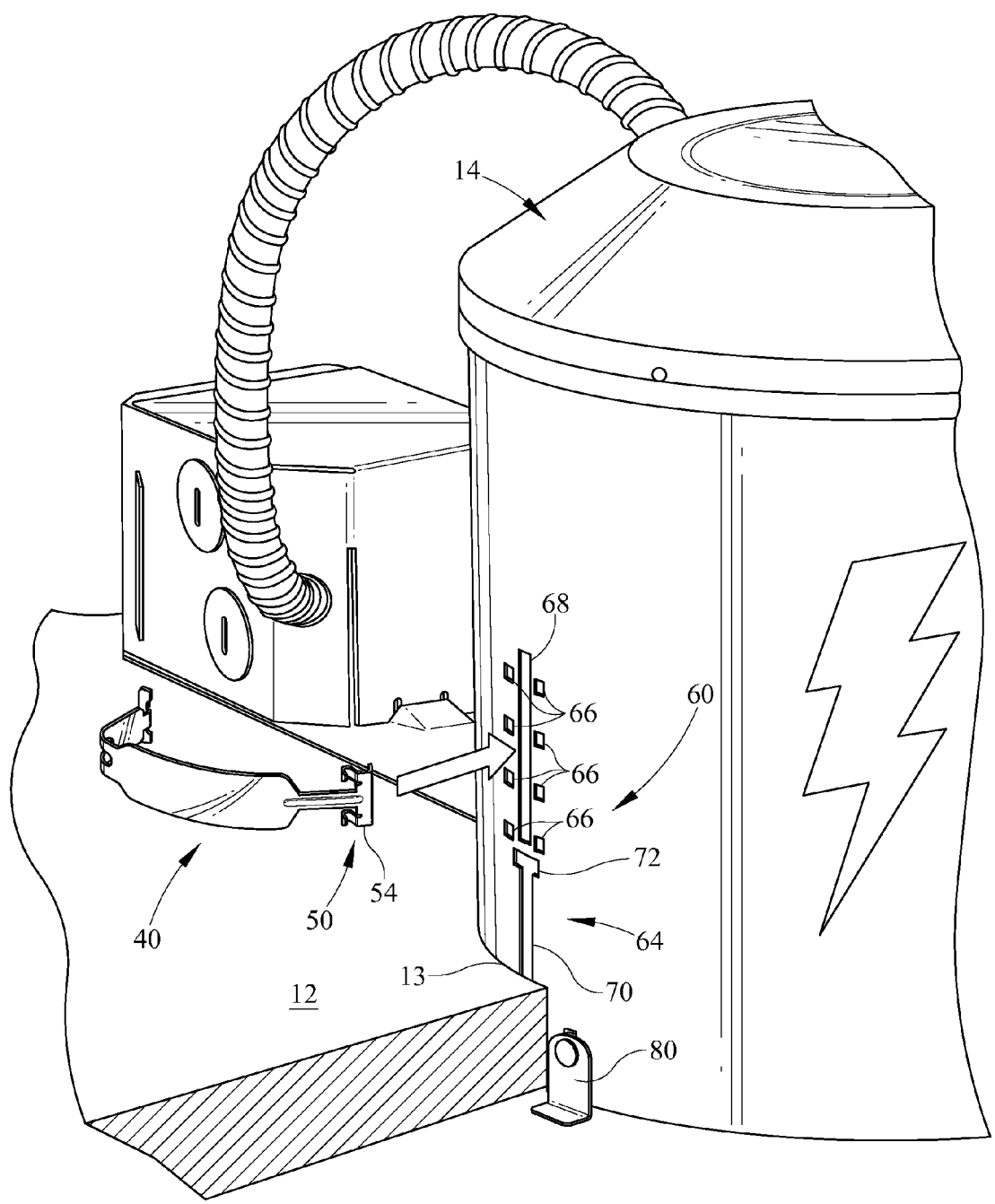
FIGS. 4-7 are a sequence of perspective views showing the captive retaining spring being inserted and positioned for use in the recessed lighting assembly.

Referring now to FIG. 4, a perspective view of the recessed lighting can 14 and retaining spring as shown wherein the spring 40 is in the first step of assembly with respect to the recessed lighting can 14. During installation of the recessed lighting can 14 to a ceiling aperture 13 (FIG. 1), it may be necessary to remove the captive retaining spring 40 from the recessed lighting can 14 and reinstall the spring 40 once the can 14 is desirably positioned within the ceiling 12. With the retaining spring removed from the can, the spring 40 is turned into a substantially horizontal orientation so that the crossbar 54 at the first end 50 is disposed substantially vertically. The spring 40 is then directed into the first slot detail 68 and the crossbar 54 extends through the slot 68.

Figure 5:
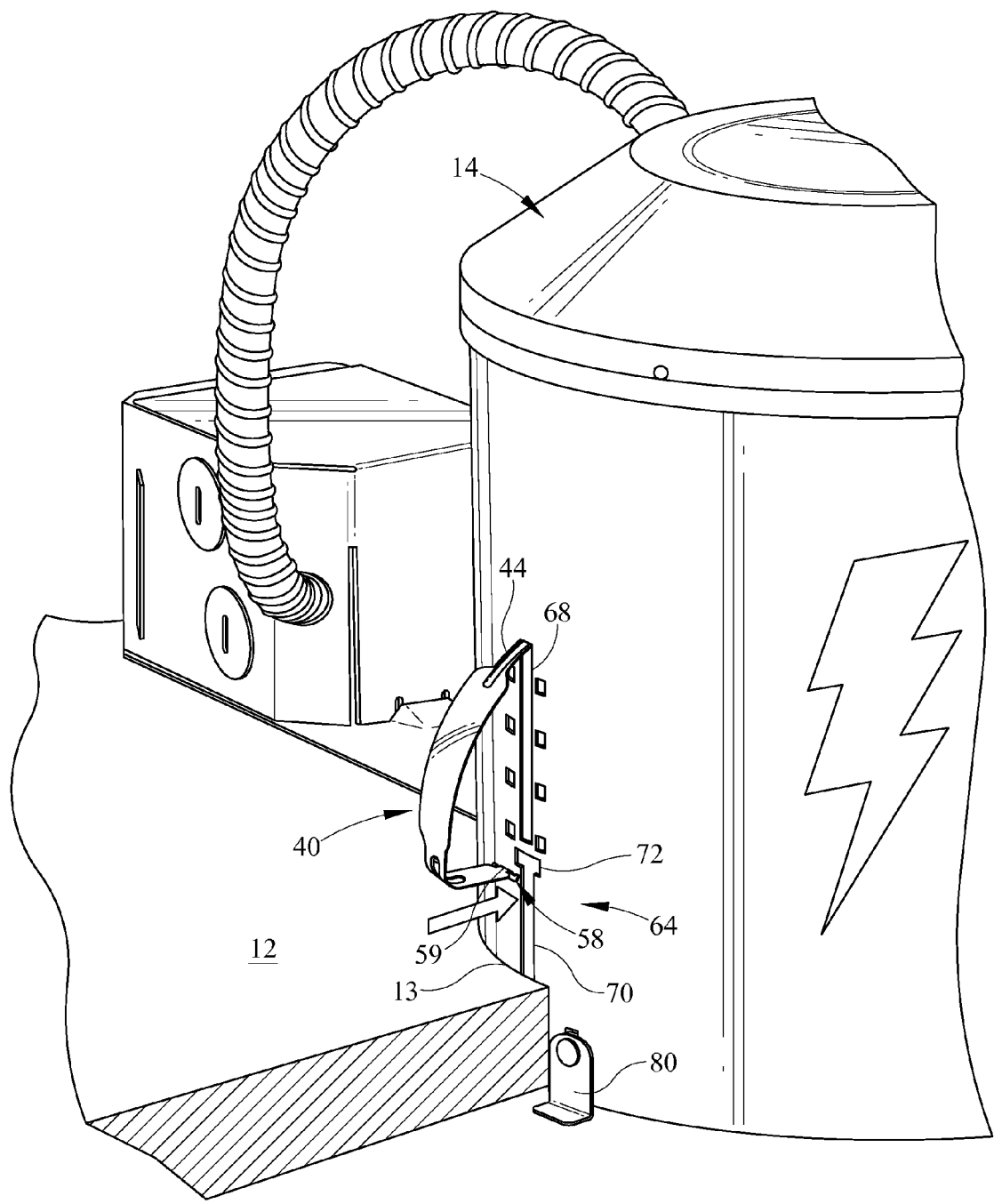

Referring now to FIG. 5, the assembly of the retaining spring 40 into the recessed can 14 continues as shown in perspective view. The spring 40 is rotated from its substantially horizontal position in FIG. 4 about the horizontal axis extending in the direction of the upper neck 44. The retaining spring 40 is also rotated downwardly about a horizontal axis perpendicular to the previously mentioned horizontal axis so that the lower retaining crossbar 58 is moved toward alignment with the horizontal detail slot 72 of the second adjustment portion 64. In order to insert the lower crossbar 58 into the horizontal slot detail 72, the first upper neck 44 should be fully upwardly positioned within the first slot 68 so that the lower crossbar 58 is aligned with the horizontal slot detail 72. As indicated by the arrow in FIG. 5, once the spring 40 is disposed in this position, the second end 52 is moved through the horizontal slot detail 72 so that the lower neck 59 may be positioned within the slot detail 70. One skilled in the art should recognize that the width of the crossbar 58 should be equal to or less than the width of the slot 72, however various alternative configurations may be utilized on the lower end 52.

Figure 6:
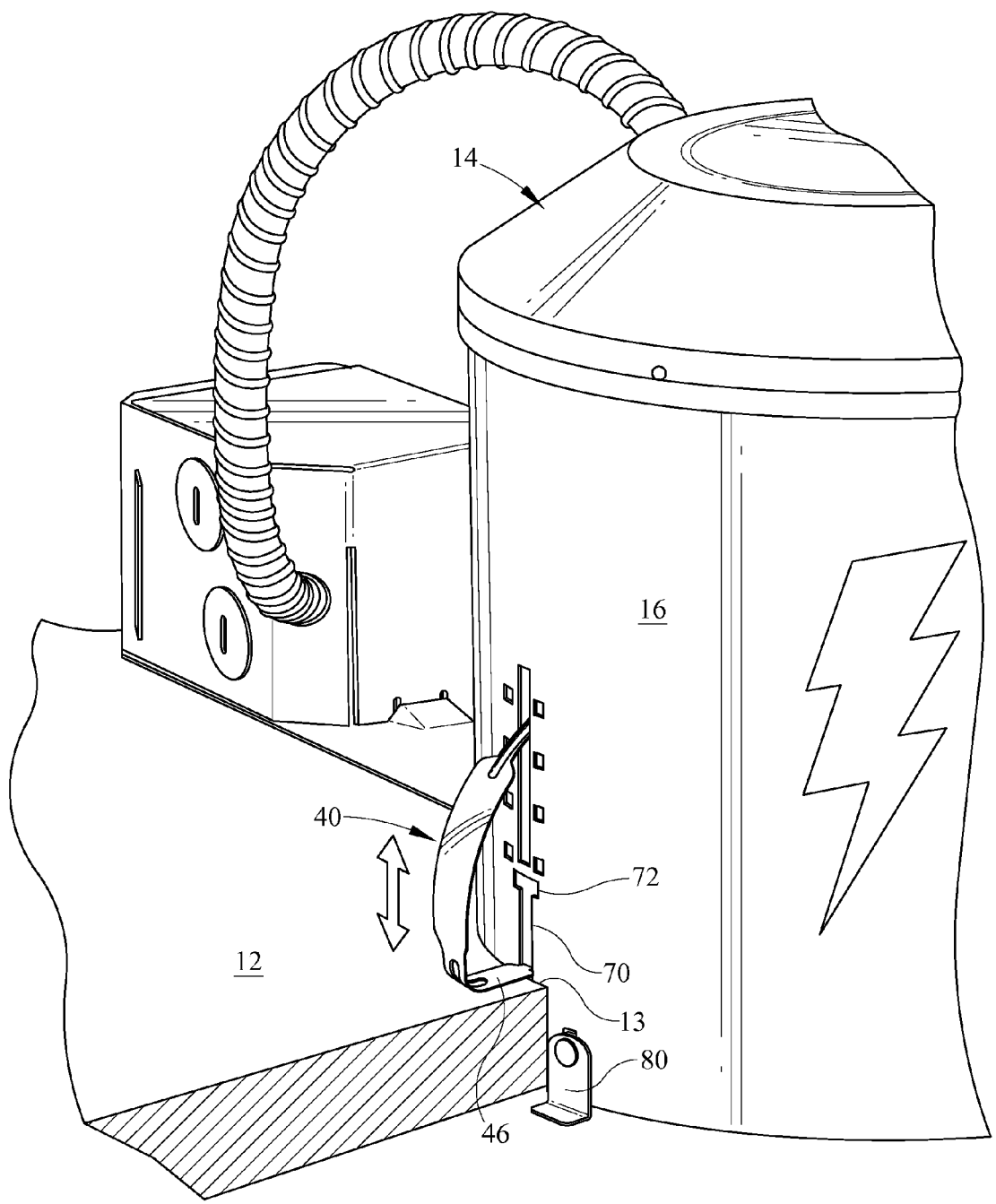
Figure 7:
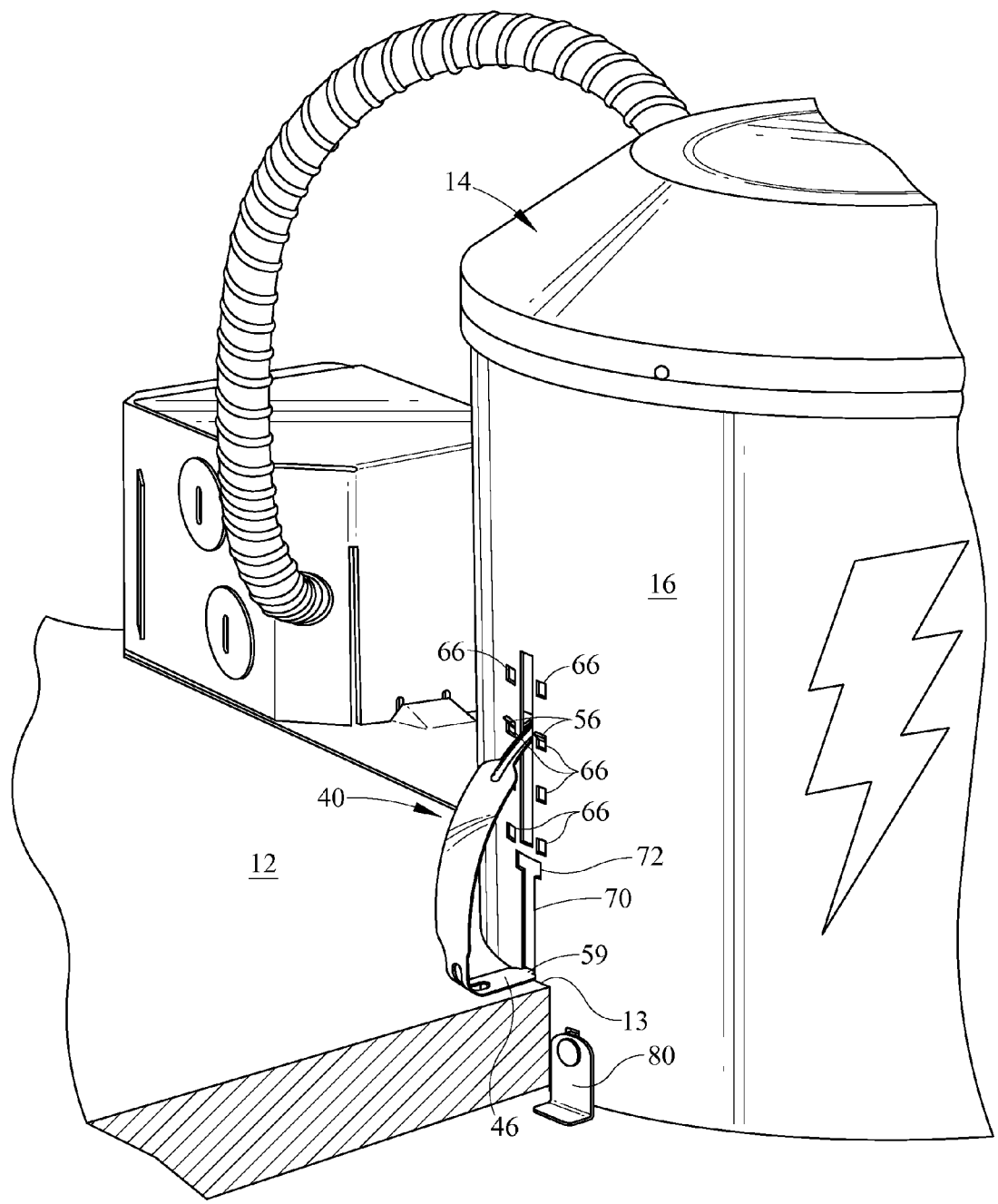

Referring now to FIG. 6, the captive retaining spring 40 is adjusted vertically within the first adjustment portion 62 and the second adjustment portion 64 to a desired position so that the spring 40 engages the upper surface of ceiling 12. The at least one leg 46 is generally disposed in a horizontal orientation so that it applies a substantially downwardly directed force across the surface area of the ceiling 12. With the at least one leg 46 engaging the upper surface of the ceiling 12, the installer may reach inside the recessed can 14 and pull the upper crossbar 54 downward so that the fingers 56 move toward the closest pair of adjustment apertures 66. The finally installed spring 40 position is depicted in FIG. 7.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A recessed mounting assembly, comprising:
   a recessed enclosure having a sidewall;
   a first adjustment portion and a second adjustment portion disposed in said sidewall;
   a retaining spring having a first end and a second end and having a substantially curvilinear shape therebetween;
   said first end disposed in said first adjustment portion, said second end disposed in said second adjustment portion;
   said retaining spring being adjustable without the use of tools by an opposed squeezing force at said first end and said second end of said retaining spring to engage or disengage one of said first adjustment portion or said second adjustment portion.

2. The recessed mounting assembly of claim 1, wherein said spring is adjustable for retaining said enclosure above ceilings of varying thicknesses.

3. The recessed mounting assembly of claim 1, wherein said spring causes a force substantially parallel to the longitudinal axis of said recessed enclosure.

4. The recessed mounting assembly of claim 1, said spring applying force to a ceiling a spaced distance from a ceiling aperture edge.

5. The recessed mounting assembly of claim 1 wherein said spring has a first cross-bar at said first end and a second cross-bar at said second end.

6. The recessed mounting assembly of claim 5 further comprising at least one finger at ends of said first cross-bar.

7. The recessed mounting assembly of claim 1, said first adjustment portion disposed above said second adjustment portion.

8. The recessed mounting assembly of claim 1, said first and second adjustment portions being connected.

9. A tool-less ceiling mounting assembly for a recessed enclosure, comprising:
   an enclosure having a sidewall;
   a captive retaining spring having a body substantially extending from said enclosure;
   said captive spring being toollessly adjustable in said recessed enclosure for use with various ceiling thicknesses;
   said captive spring applying a substantially vertical retaining force between said enclosure and a ceiling;
   an upper cross arm positioned on said spring, said cross arm having fingers which engage at least one adjustment apertures adjacent a spring adjustment area in said sidewall of said enclosure to apply said retaining force.

10. The tool-less ceiling mounting assembly of claim 9, further comprising a clip depending from a lower end of said enclosure.

11. The tool-less ceiling mounting assembly of claim 10, said captive spring having a knee, said knee engaging said ceiling.

12. The tool-less ceiling mounting assembly of claim 9, said sidewall being substantially cylindrical in shape.

13. The tool-less ceiling mounting assembly of claim 9, said sidewall having said spring adjustment area wherein said spring may be adjustably retained.

14. The tool-less ceiling mounting assembly of claim 13, said spring adjustment area receiving a first end of said captive spring and a second end of said spring.

15. The tool-less ceiling mounting assembly of claim 14, said first end and said second end of said captive spring being adjustable in a vertical direction.

16. The tool-less ceiling mounting assembly of claim 9 wherein said spring adjustment area is disposed in said can and receives said captive spring.

17. The tool-less ceiling mounting assembly of claim 16, said spring adjustment area being a first adjustment portion and a second adjustment portion.

18. The tool-less ceiling mounting assembly of claim 17, said first and second adjustment portions being connected.

19. A tool-less recessed mounting assembly for a recessed light, comprising:
   a recessed lighting can having a substantially cylindrical sidewall;
   a spring adjustment area in said cylindrical sidewall including a first portion and a second portion;
   a spring extending from said cylindrical sidewall and disposed within said spring adjustment area and adjustable through said spring adjustment area without the use of tools;
   a connection between said spring and said cylindrical sidewall being adjustable by hand with an opposed squeezing force on ends of said spring and without the use of tools;
   said spring creating a force due to engagement with said recessed lighting can.

20. The tool-less recessed mounting assembly of claim 19, said spring having a first end engaging said sidewall at said spring adjustment area.

21. The tool-less recessed mounting assembly of claim 19, said force being substantially vertically directed.

22. The tool-less recessed mounting assembly of claim 19, said spring providing said force a spaced distance from an edge of a ceiling aperture.

23. The tool-less recessed mounting assembly of claim 19 further comprising a clip depending from said recessed lighting can.

24. A recessed enclosure mounting assembly, comprising:
   a retaining spring having a first end, a second end and a knee therebetween, said knee disposed outside said recessed enclosure;
   an said recessed enclosure having a sidewall and at least one adjustment area for receiving said spring;

a ceiling structure having an aperture, said enclosure extending through said aperture;

said retaining spring receiving an opposed squeeze force to bias and capture said retaining spring between said adjustment area and an upper surface of said ceiling structure, said retaining spring directly engaging said sidewall to create a downforce on said ceiling structure.

25. The recessed enclosure mounting assembly of claim 24, said retaining spring providing said downward force on said ceiling structure a spaced distance from an edge of said ceiling aperture.

26. The recessed enclosure mounting assembly of claim 24, said adjustment area having a first adjustment portion and a second adjustment portion.

27. The recessed enclosure mounting assembly of claim 26, said first adjustment portion comprising a plurality of adjustment apertures.

28. The recessed enclosure mounting assembly of claim 24, said retaining spring being vertically adjustable through said adjustment area.

29. The recessed enclosure mounting assembly of claim 28, said retaining spring being adjustable without the use of tools.

30. The recessed enclosure mounting assembly of claim 24, said retaining spring having an elastic body, an upper neck extending from said elastic body and a lower neck below said elastic body.

31. The recessed enclosure mounting assembly of claim 30, said upper neck and said lower neck slideably extending through said sidewall of said enclosure.

32. A combination captive retaining spring and enclosure for a recessed mounting assembly, comprising:

an enclosure having a sidewall;

said sidewall having a plurality of vertically spaced adjustment apertures for vertical adjustment of said enclosure;

a retaining spring adjustably disposed through said enclosure without the use of a tool;

a clip depending from said enclosure;

a ceiling structure having an upper surface and a lower surface;

said retaining spring having at least one finger which engages at least one of said adjustment apertures to create a downforce on said ceiling structure, said at least one finger engaging said at least one of said adjustment apertures when a squeeze force is applied to ends of said retaining spring;

said upper surface engaged by said retaining spring and said lower surface engaged by said clip.

33. The combination of claim 32, said retaining spring providing a downward force on said ceiling structure spaced from an aperture edge of said ceiling structure.

34. The combination of claim 32, said retaining spring being toollessly adjustable.

* * * * *